(12) United States Patent
Jo et al.

(10) Patent No.: US 10,014,029 B2
(45) Date of Patent: Jul. 3, 2018

(54) VIDEO PROCESSING APPARATUS AND METHOD

(71) Applicant: SAMSUNG ELECTRONICS CO., LTD., Suwon-si (KR)

(72) Inventors: Gye-wook Jo, Uiwang-si (KR); Won-cheul Kim, Yongin-si (KR); Sang-hoon Lee, Seoul (KR); Jong-woo Kim, Seoul (KR); Min Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/324,019

(22) PCT Filed: Jun. 17, 2015

(86) PCT No.: PCT/KR2015/006112
§ 371 (c)(1),
(2) Date: Jan. 5, 2017

(87) PCT Pub. No.: WO2016/060358
PCT Pub. Date: Apr. 21, 2016

(65) Prior Publication Data
US 2017/0206929 A1 Jul. 20, 2017

(30) Foreign Application Priority Data
Oct. 16, 2014 (KR) ........................ 10-2014-0140171

(51) Int. Cl.
*H04N 5/932* (2006.01)
*H04N 9/80* (2006.01)
(Continued)

(52) U.S. Cl.
CPC ........ *G11B 27/031* (2013.01); *G06K 9/00744* (2013.01); *G06K 9/00765* (2013.01); *H04N 5/775* (2013.01)

(58) Field of Classification Search
CPC ............. G11B 27/031; G06K 9/00765; G06K 9/00744; H04N 5/775
(Continued)

(56) References Cited

U.S. PATENT DOCUMENTS 6,342,904 B1    1/2002   Vasudevan et al.
6,804,295 B1   10/2004   Belknap
(Continued)

FOREIGN PATENT DOCUMENTS

KR   10-2012-0126953 A   11/2012
KR   10-2014-0023660 A    2/2014
(Continued)

OTHER PUBLICATIONS

International Search Report, issued by International Searching Authority in corresponding International Application No. PCT/KR2015/006112, dated Sep. 21, 2015, (PCT/ISA/210).
(Continued)

*Primary Examiner* — Robert Chevalier
(74) *Attorney, Agent, or Firm* — Sughrue Mion, PLLC (57) ABSTRACT

Provided is a video processing method and apparatus. The video processing method includes acquiring an input video including a plurality of video frames and audio frames; dividing the input video into one or more sections; determining a representative video frame from among the plurality of video frames with respect to each of the one or more sections; and acquiring a slide video that includes the representative video frames.

11 Claims, 8 Drawing Sheets

(51) Int. Cl.
*G11B 27/031* (2006.01)
*G06K 9/00* (2006.01)
*H04N 5/775* (2006.01)

(58) Field of Classification Search
USPC ....... 386/201, 241, 248, 278, 281, 285, 290, 386/337, 338
See application file for complete search history.

(56) References Cited

U.S. PATENT DOCUMENTS

| | | |
|---|---|---|
| 2004/0128308 A1* | 7/2004 | Obrador ............ G06F 17/30056 |
| 2007/0154164 A1 | 7/2007 | Liu et al. |
| 2009/0150784 A1 | 6/2009 | Denney et al. |
| 2009/0196574 A1 | 8/2009 | Lidestri |
| 2009/0209237 A1 | 8/2009 | Six |
| 2012/0098998 A1* | 4/2012 | Lee ....................... H04N 5/772 348/231.4 |
| 2013/0335519 A1 | 12/2013 | Greenslade et al. |
| 2014/0050400 A1 | 2/2014 | Park et al. |
| 2014/0115640 A1 | 4/2014 | Walsh et al. |

FOREIGN PATENT DOCUMENTS

| | | |
|---|---|---|
| WO | 9834182 A2 | 8/1998 |
| WO | 2008113064 A1 | 9/2008 |

OTHER PUBLICATIONS

Communication dated Nov. 24, 2017, from the European Patent Office in counterpart European Application No. 15850379.7.

* cited by examiner

VIDEO PROCESSING APPARATUS AND METHOD

TECHNICAL FIELD

One or more exemplary embodiments relate to a video processing apparatus and method, and more particularly, to a video processing apparatus and method whereby a slide video including representative video frames from among a plurality of video frames included in a video is acquired.

BACKGROUND ART

As televisions (TVs) having smart functions have been developed, TVs may have functions of processing content according to users' preferences, as well as basic TV functions, that is, receiving and reproducing content including images and voice signals. Therefore, the importance of an apparatus or an application having a function of processing content that may be loaded on smart TVs has increased. Development of such a content processing function has become an important success factor with regard to smart TVs.

DISCLOSURE OF INVENTION

Technical Problem when the storage capacity is insufficient for the full-frame video, it is difficult to record and save the full-frame video in the storage. Thus, there are technical needs to convert the full-frame video into the slide video to reduce the file size of the recorded video and create new contents in new formats.

Solution to Problem

One or more exemplary embodiments include a video processing apparatus and method capable of acquiring a slide video including representative video frames and audio from input video.

One or more exemplary embodiments include a computer-readable recording medium having embodied thereon a program for executing the video processing method in a computer.

Additional aspects will be set forth in part in the description which follows and, in part, will be apparent from the description, or may be learned by practice of the presented exemplary embodiments.

According to one or more exemplary embodiments, a video processing method includes: acquiring an input video including a plurality of video frames and audio frames; dividing the input video into one or more sections; determining a representative video frame from among the plurality of video frames with respect to each of the one or more sections; and acquiring a slide video that includes the representative video frames, wherein each of the representative video frames is displayed as long as a play time of a section corresponding to each of the representative video frames, and each of the representative video frame is synchronized with audio frames corresponding to the section of the representative video frames.

The dividing of the input video may be performed so that the one or more sections have equal lengths.

The determining of the representative video frame may be performed based on information about viewer's preferences when the information about the viewer's preferences with respect to the plurality of video frames included in the input video is provided.

The determining of the representative video frame may be performed based on analysis of at least one of the audio frames and the plurality of video frames.

When a certain sound is detected from the audio frames, the representative video frame may be determined based on a location where the certain sound is reproduced.

When a certain object provided from the input video is included in a video frame, the video frame including the certain object may be determined as the representative video frame.

The video processing method may further include extracting a representative text corresponding to the representative video frame, when text information accompanied with the input video is provided, and wherein the acquiring of the slide video may include acquiring a slide video that includes the representative text corresponding to the representative video frame.

According to one or more exemplary embodiments, a video processing apparatus includes: an input unit configured to receive an input video including a plurality of video frames and audio frames; and a video processing unit configured to divide the input video into one or more sections, determine a representative video frame from among the plurality of video frames included in each section with respect to each of the one or more sections, and acquire a slide video that includes the representative video frames, wherein each of the representative video frames is displayed as long as a play time of a section corresponding to each of the representative video frames, and each of the representative video frames is synchronized with the audio frames corresponding to the section of the representative video frames.

The video processing unit may divide the input video so that the one or more sections have equal lengths.

When information about viewer's preferences with respect to the plurality of video frames included in the input video is provided with the input video, the video processing unit may be further configured to determine the representative video frame based on the information about the viewer's preferences.

The image processing apparatus of claim 8, wherein the video processing unit may be further configured to determine the representative video frame based on analysis of at least one of the audio frames and the plurality of video frames.

When a certain sound is detected from the audio frames, the video processing unit may be further configured to determine the representative video frame based on a location where the certain sound is reproduced.

When a certain object provided from the input video is included in a video frame, the video processing unit may be further configured to determine the video frame including the certain object as the representative video frame.

The input unit may be further configured to acquire text information when the text information accompanied with the input video is provided, and the video processing unit may be configured to extract a representative text corresponding to the representative video frame from the text information and acquire the slide video in which the representative text corresponding to the representative video frame is included.

According to one or more exemplary embodiments, there is provided a computer-readable recording medium having embodied thereon a computer program for executing the video processing method.

Advantageous Effects of Invention

The video processing method for slide video can be applied to not only a smart TV but also a conventional TV. Particularly, when the storage capacity is insufficient for the full-frame video, the video processing method for slide video can be a good solution to save the storage capacity.

When a storage device, such as USB or HDD, is connected to the TV, the TV which does not contains the PVR (Personal video recorder) system can provide the similar-PVR functions by storing the generated slides in the storage device. Furthermore, new contents may be acquired from an existing video with the video processing method for slide video.

BRIEF DESCRIPTION OF DRAWINGS

These and/or other aspects will become apparent and more readily appreciated from the following description of the exemplary embodiments, taken in conjunction with the accompanying drawings in which.

BEST MODE FOR CARRYING OUT THE INVENTION

According to one or more exemplary embodiments, a video processing method includes: acquiring an input video including a plurality of video frames and audio frames; dividing the input video into one or more sections; determining a representative video frame from among the plurality of video frames with respect to each of the one or more sections; and acquiring a slide video that includes the representative video frames, wherein each of the representative video frames is displayed as long as a play time of a section corresponding to each of the representative video frames, and each of the representative video frame is synchronized with audio frames corresponding to the section of the representative video frames.

According to one or more exemplary embodiments, a video processing apparatus includes: an input unit configured to receive an input video including a plurality of video frames and audio frames; and a video processing unit configured to divide the input video into one or more sections, determine a representative video frame from among the plurality of video frames included in each section with respect to each of the one or more sections, and acquire a slide video that includes the representative video frames, wherein each of the representative video frames is displayed as long as a play time of a section corresponding to each of the representative video frames, and each of the representative video frames is synchronized with the audio frames corresponding to the section of the representative video frames.

MODE FOR THE INVENTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Figure 1:
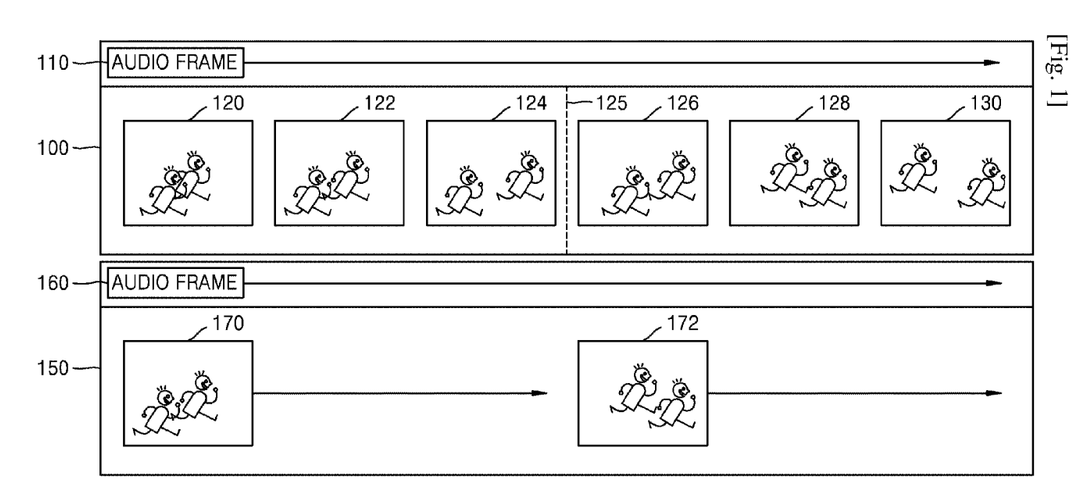
FIG. 1 is a diagram of a slide video according to an exemplary embodiment.

FIG. 1 is a diagram of a slide video according to an exemplary embodiment.

An upper block 100 displays audio data 110 and a plurality of video frames 120, 122, 124, 126, 128, and 130 of an input video before being processed by a video processing apparatus according to passage of time. Although only the six video frames 120, 122, 124, 126, 128, and 130 are shown in the upper block 100 for convenience of description, the input video may include more video frames. A video frame at a left side is earlier than a video frame at a right side. Therefore, temporally, the video frame 120 at a leftmost side is the earliest video frame, and the video frame 130 at a rightmost side is the last video frame. The audio data 110 includes a plurality of audio frames that corresponds to video frames (not drawn in FIG. 1).

The upper block 100 may be divided into two sections based on a center dotted line 125. The video frames 120, 122, and 124 are included in a section at a left side based on the dotted line 125. The video frames 126, 128, and 130 are included in a section at a right side of the dotted line 125. For example, a representative video frame is determined in each section. According to an example of FIG. 1, the video frame 122 is determined as the representative video frame in the left section of the dotted line 125, and the video frame 128 is determined as the representative video frame in the right section of the dotted line 125.

A lower block 150 includes audio data 160 and representative video frames 170 and 172 of a slide video. The audio 160 of the lower block 150 may be the same as the audio 110 of the upper block 100. Referring to FIG. 1, since the video frame 122 is determined as the representative video frame at the left side, the representative video frame 170 is the same as the video frame 122. Also, since the video frame 128 is determined as the representative video frame at the right side, the representative video frame 172 is the same as the video frame 128. The audio data 160 includes a plurality of audio frames that corresponds to video frames (not drawn in FIG. 1). The audio data 110 may be identical to the audio data 160

In the slide video, the representative video frame 170 is displayed during a period of reproducing the video frames 120, 122, and 124 in the input video. Likewise, the representative video frame 172 is displayed during a period of reproducing the video frames 126, 128, and 130 in the input video.

In FIG. 1, the representative video frame is displayed with respect to three video frames for the convenience of description, but the representative video frame may be displayed with respect to less or more video frames.

Figure 2:
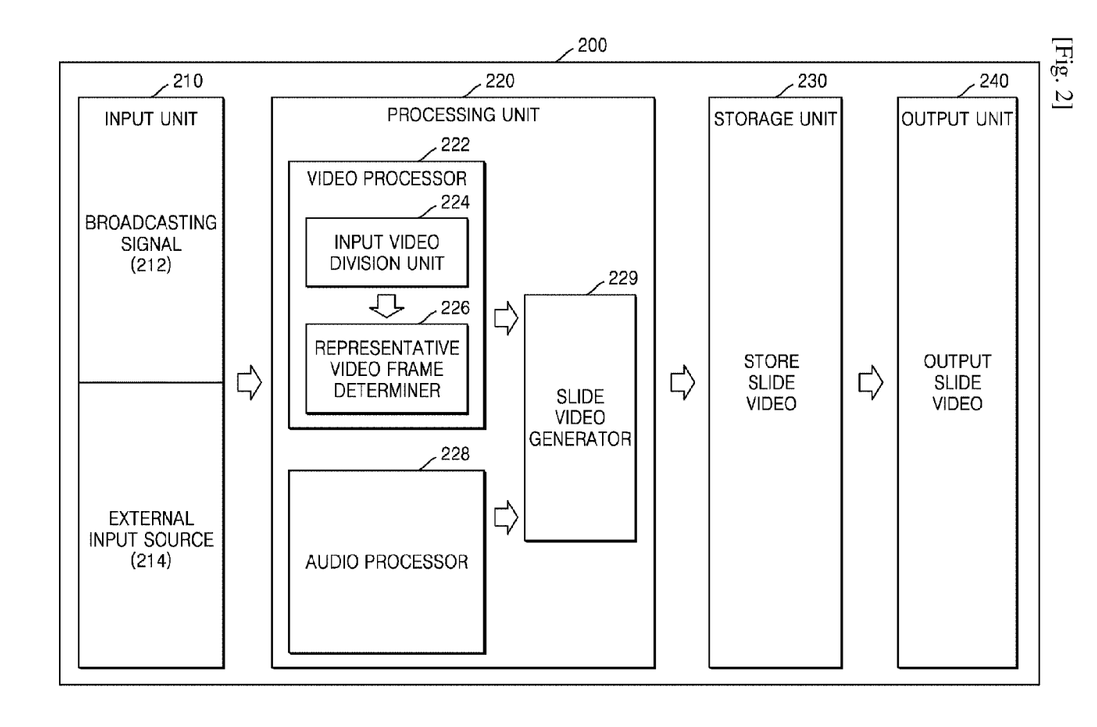
FIG. 2 is a block diagram of a video processing apparatus according to an exemplary embodiment.

FIG. 2 is a block diagram of a video processing apparatus 200 according to an exemplary embodiment.

The video processing apparatus 200 may include an input unit 210, a video processing unit 220, a storage unit 230, and an output unit 240. In FIG. 2, the input unit 210 and the output unit 240 are shown as separate units, but the input unit 210 and the output unit 240 may be combined as one unit according to some embodiments. Likewise, the video processing unit 220 may be combined with at least one of the input unit 210 and the output unit 240. In FIG. 2, the input unit 210, the video processing unit 220, the storage unit 230, and the output unit 240 are located in the video processing apparatus 200; however, the input unit 210, the video processing unit 220, the storage unit 230, and the output unit 240 are not necessarily adjacent to each other. Therefore, according to some embodiments, the input unit 210, the video processing unit 220, the storage unit 230, and the output unit 240 may be dispersed. The video processing apparatus 200 of FIG. 2 is not limited to a physical apparatus. For example, some of the functions of the video processing apparatus 200 may be implemented as software, not hardware.

The input unit 210 may acquire an input video including a plurality of video frames and audio. The input unit 210 may acquire various kinds of data accompanied with the input video. For example, if the input video include text information such as subtitles, the input unit 210 may also acquire the text information. As another example, if the input video includes metadata about a producer, a play time, and an encoding type of the input video, the input unit 210 may also acquire the metadata.

The input unit 210 may acquire input videos from various sources. For example the input unit 210 may acquire input videos at constant intervals from a broadcasting signal 210 in real time. As another example, the input unit 210 may acquire input videos from an external input source 214 such as a CD, a DVD, a USB, or an HDMI. The input unit 210 may be implemented as a transmitter, a CD reader, a DVD reader, a processor or a device that can read video and audio data. Also, the input unit 210 may be implemented as a software that performs inputting video and audio data to the processor 220.

The video processing unit 220 may include a video processor 222, an audio processor 228, and a slide video generator 229. The video processing unit 220 may be implemented as one of more processors.

The video processor 222 may include an input video division unit 224 and a representative video frame determiner 226, and determines a representative video frame from the input video.

The input video division unit 224 may divide the input video into at least one section. The input video division unit 224 may divide the input video so that each divided section has a constant length. For example, the input video division unit 224 may divide the input video so that the divided sections have video frames of the equal number.

The input video division unit 224 may divide the input video so that the divided sections have different lengths from each other, according to some embodiments. For example, if the input video includes text regarding dialogues between persons, the input video division unit 224 may divide the input video so that the divided sections have different lengths that vary depending on amount of the text.

The representative video frame determiner 226 may determine a representative video frame from among the video frames included in each of the sections that are divided by the input video division unit 224. The representative video frame determiner 226 may determine the representative video frame based on various criteria. For example, the representative video frame determiner 226 may determine the representative video frame based on viewer preference information, if the input unit 210 acquires the information about the viewer preference with respect to the frames included in the input video. As another example, the representative video frame determiner 226 may determine the representative video frame based on analysis on at least one of audio and video frames. An example of determining the representative video frame based on the analysis of the audio and video frames is illustrated with reference to FIGS. 3 and 4.

The representative video frame determiner 226 may encode and output the determined representative video frame. For example, the representative video frame determiner 226 may encode the representative video frame in a file format such as jpg, gif, or png, and output the encoded representative video frame.

The audio processor 228 may extract audio data from the input video. The audio processor 228 may encode the extracted audio data and output the encoded audio data. For example, the audio processor 228 may encode the audio data in a file format such as mp3 or wma, and may output the encoded audio data.

The slide video generator 229 may generate a slide video by synchronizing the representative video frame output from the video processor 222 and the audio data output from the audio processor 228 with each other. For example, if a representative video frame A is on behalf of video frames included in a time period from 00:00 to 00:05 of the input video, the representative video frame A may be synchronized with a part of the audio data corresponding to the time period 00:00 to 00:05. The slide video generated as above plays the part of the audio data corresponding to the time period 00:00 to 00:05 in the section of 00:00 to 00:05, and at the same time, displays the representative video frame A.

The slide video generator 229 may make metadata provided with the input video included in the slide video. For example, the slide video generator 229 may make metadata about a producer, a play time, and an encoding type of the input video included in the slide video.

Figure 5:
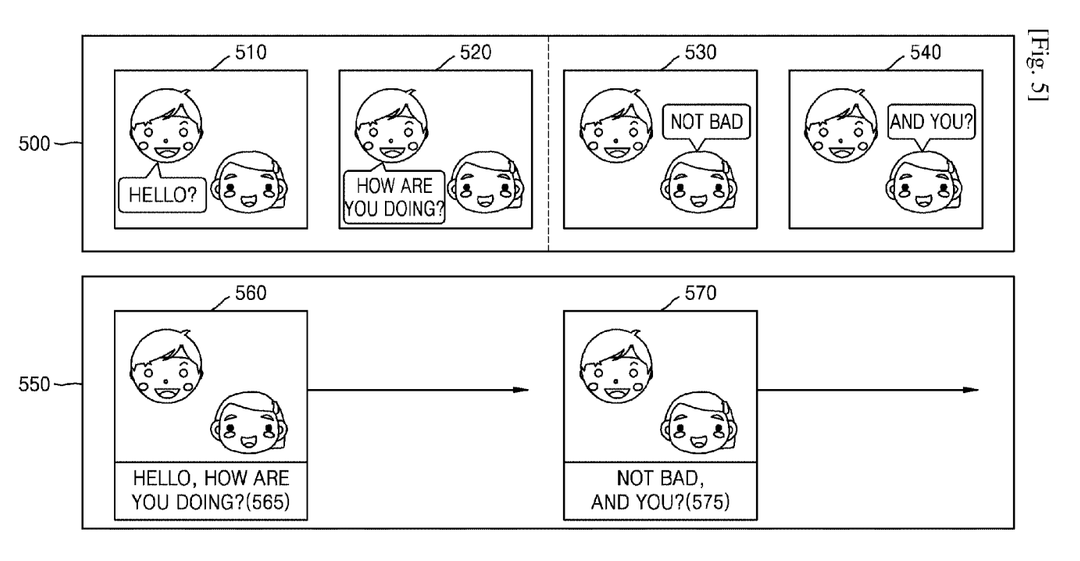
FIG. 5 is a diagram illustrating an example of displaying text on a slide video.

In addition, if the input unit 210 acquires text information accompanied with the input video, the slide video generator 229 extracts representative text corresponding to the representative video frame from the text information and adds the representative text to the video frame that is determined as the representative video frame. An example of adding the representative text to the representative video frame is shown in FIG. 5.

The storage unit 230 may store the slide video acquired by the processing unit 220. The storage unit 230 may be a volatile memory, a non-volatile memory, an internal memory, an external memory, or a combination thereof. For example, the storage unit 230 may be a non-volatile storage device such as a non-volatile random access memory (NVRAM), a flash memory, and a disk storage device, or a volatile storage device such as a static random access memory (SRAM).

The storage unit 230 may store the representative video frame and the audio configuring the slide video, as well as the slide video. Also, if the slide video provides the text information such as subtitles or the metadata of the input video, the storage unit 230 may store the text information or the metadata.

The output unit 240 may output the slide video acquired by the processing unit 220 or the slide video stored in the storage unit 230 to an external device of the video processing apparatus 200. The output unit 240 may be connected to the external device in various ways. The output unit 240 may be implemented as a transmitter or a variety of device that transmits the data to the external device. Also, the output unit may be implemented as a display that reproduces the slide video.

Figure 3:
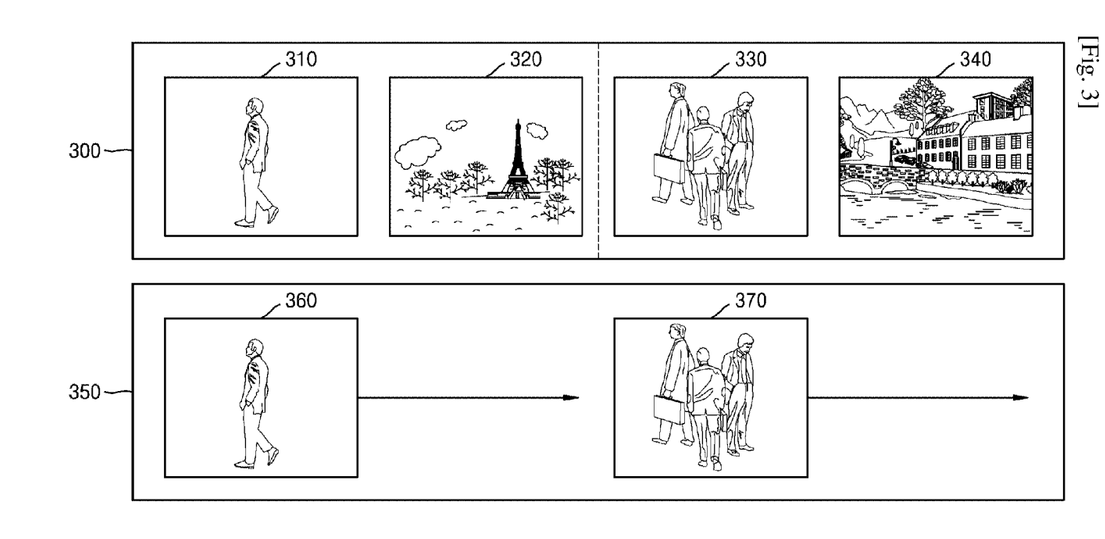
FIG. 3 is a diagram illustrating an example of determining a representative video frame.
Figure 4:
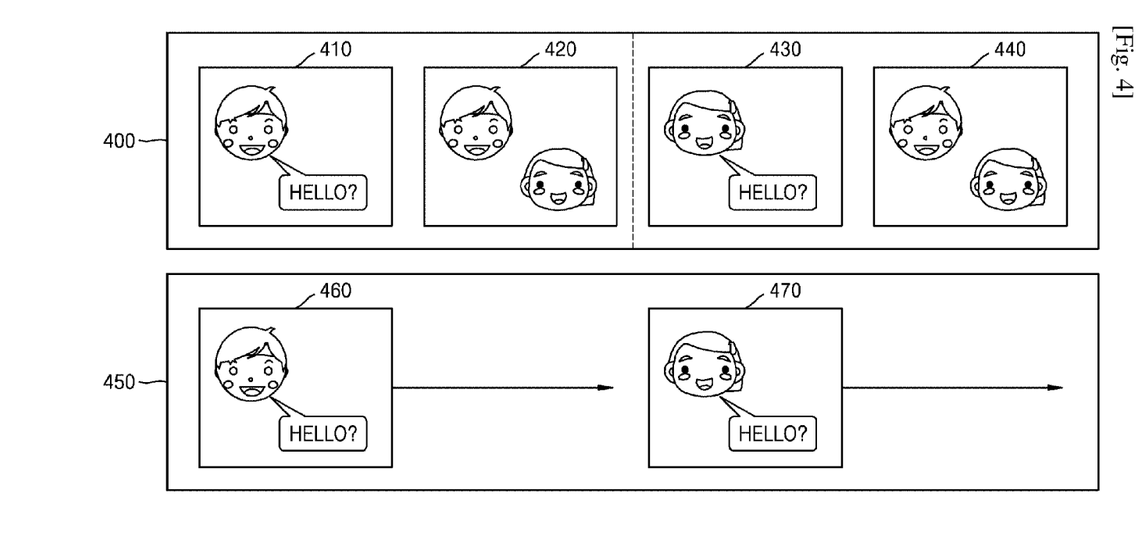
FIG. 4 is a diagram illustrating another example of determining a representative video frame.

FIGS. 3 and 4 illustrate determining of the representative video frame by the video frame determiner 226 of FIG. 2 based on analysis of the audio or video frames.

FIG. 3 is a diagram illustrating an example of determining the representative video frame by analyzing the video frames.

An upper block 300 displays a plurality of video frames 310, 320, 330, and 340 of the input video according to lapse of time. The upper block 300 includes only four video frames for convenience of description, but more video frames may be included in the input video. A video frame located at a left side is temporally earlier than a video frame located at a right side. Therefore, the video frame 310 that is located at the leftmost side is the earliest video frame, and the video frame 340 that is located at the rightmost side is the latest video frame.

The upper block 300 is divided into two sections based on a dotted line on a center portion thereof. A left section of the dotted line includes the video frames 310 and 320. A right section of the dotted line includes the video frames 330 and 340. Each of the sections has a representative video frame.

A video frame including a certain object in the section may be determined as the representative video frame. In FIG. 3, a video frame including a person is determined as the representative video frame. Thus, the video frames 310 and 330 including persons are determined as the representative video frames, and the video frames 320 and 340 including no person are not determined as the representative video frames. Therefore, a representative video frame 360 in a lower block 350 is the same as the video frame 310. Also, a representative video frame 370 is the same as the video frame 330.

In FIG. 3, the representative video frame is displayed on behalf of two video frames, but one or more embodiments are not limited thereto. That is, in actual cases, the representative video frame may be displayed on behalf of the video frames more than three.

FIG. 4 is a diagram illustrating an example of determining a representative video frame by analyzing audio.

An upper block 400 displays a plurality of video frames 410, 420, 430, and 440 of an input video according to lapse of time. The upper block 400 includes only four video frames 410, 420, 430, and 440 for convenience of description, but more video frames may be included in the input video.

A video frame located at a left side is temporally earlier than a video frame located at a right side. Therefore, the video frame 410 that is located at the leftmost side is the earliest video frame, and the video frame 440 that is located at the rightmost side is the latest video frame.

The upper block 400 is divided into two sections based on a dotted line at a center portion thereof. A left section of the dotted line includes the video frames 410 and 420. A right section of the dotted line includes the video frames 430 and 440. Each of the sections has a representative video frame.

If a certain sound is detected from the audio in each section, the representative video frame may be determined based on a location where the certain sound is detected. In FIG. 4, a video frame that is close to a location where human voice is recognized is determined as the representative video frame. Therefore, when the video frames 410 and 430 are displayed, the human voice is detected, and when the video frames 420 and 440 are displayed, the human voice is not detected. Therefore, the video frame 410 is determined as the representative video frame in the left section of the dotted line, and the video frame 420 is determined as the representative video frame in the right section of the dotted line. Therefore, a representative video frame 460 in a lower block 450 is the same as the video frame 410. Likewise, a representative video frame 470 is the same as the video frame 430.

In FIG. 4, the representative video frame is displayed on behalf of two video frames for convenience of description, but in actual cases, the representative video frame may be displayed on behalf of the video frames more than two.

FIG. 5 is a diagram illustrating an example of displaying a representative text on the representative video frame according to one or more exemplary embodiments.

An upper block 500 displays a plurality of video frames 510, 520, 530, and 540 of an input video according to lapse of time. According to FIG. 5, the upper block 500 includes four video frames 510, 520, 530, and 540 for convenience of description, but more video frames may be included in the input video.

The upper block 500 is divided into two sections based on a dotted line on a center portion thereof. A left section of the dotted line includes the video frames 510 and 520. A right section of the dotted line includes the video frames 530 and 540. One representative video frame is determined in each of the sections.

When the video frame 510 at the leftmost side is displayed, voice 'hello' is detected. When the video frame 520 is displayed, voice 'how are you doing?' is detected. When the video frame 530 is displayed, voice 'not bad' is detected. When the video frame 540 is displayed, voice 'and you?' is detected.

A slide video may recognize the voice detected in a section corresponding to the representative video frame, and may display text corresponding to the recognized voice with the representative video frame. For example, a representative frame 560 is displayed with a text 'hello, how are you doing?' 565 that is a combination of the voices detected from the video frames 510 and 520 on a lower portion thereof. A representative video frame 570 is displayed with a text 'not bad, and you?' 575 that is a combination of the voices detected from the video frames 530 and 540 on a lower portion thereof.

In FIG. 5, the text corresponding to the detected voice is displayed in the lower portion of the representative video frame, but according to some embodiments, the text may be displayed in another portion.

If text information about the audio of the input video is acquired with the input video, text corresponding to the detected voice may be extracted from the text information and displayed, instead of recognizing the detected voice.

Figure 6:
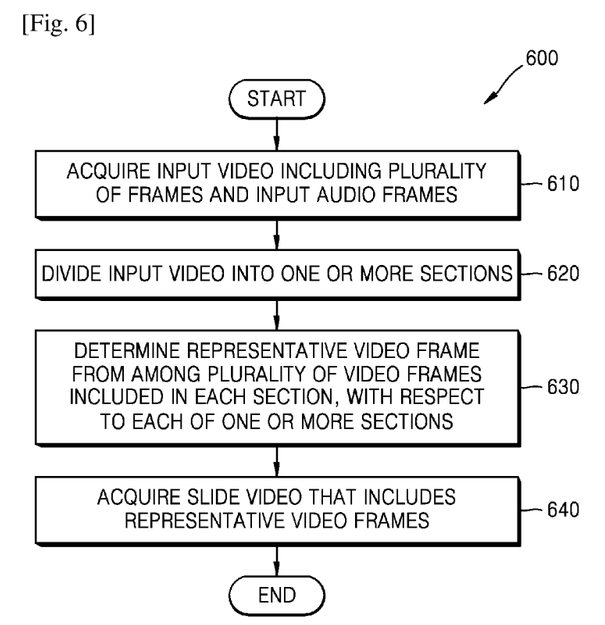
FIG. 6 is a flowchart of a video processing method according to an exemplary embodiment.

FIG. 6 is a flowchart of a video processing method 600 according to one or more exemplary embodiments.

In operation S610, an input video including a plurality of video frames and audio frames are acquired. Information about viewer's preferences with respect to the video frames of the input video may be acquired with the input video. Also, text information about the input video may be acquired.

In operation S620, the input video is divided into one or more sections. The input video may be divided so that each of the sections has an equal length to each other.

In operation S630, a representative video frame from among the video frames included in each of the sections is determined with respect to each of the one or more sections. If view preference information including reactions of the viewers with respect to the video frames included in the input video is provided with the input video, the representative video frame may be determined based on the viewer preference information.

Also, the representative video frame may be determined by analyzing at least one of the audio and the video frames. For example, if a certain sound is detected from the audio, the representative video frame may be determined on a location where the certain sound is reproduced. As another example, if a video frame includes a certain object in the input video, the video frame including the certain object may be determined as a representative video frame.

In operation S640, each of the representative video frames is synchronized with the audio, and then, a slide video displayed as long as a reproduction time of the section corresponding to the representative video frame is acquired.

Figure 7:
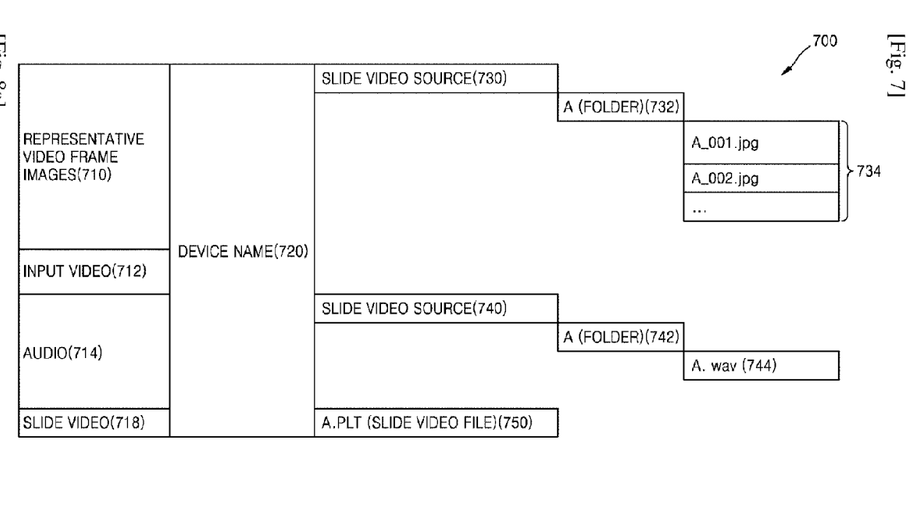
FIG. 7 is a diagram of a slide video file.

FIG. 7 is a diagram of a slide video file according to one or more exemplary embodiments.

The storage unit 230 of FIG. 2 may store a slide video 718, and representative video frame images 710 and audio 714 included in the slide video 718. Also, the storage unit 230 may include an input video 712 that is an original video of the slide video 718.

The representative video frame images 710 may be compressed as file formats such as jpg or gif. File names of the representative video frame images 710 may be determined to be related to a file name of the slide video 718. Referring to FIG. 7, if the file name of the slide video 718 is determined as A.PLT 750, file names of the representative video frame images 710 may be determined as A_001.jpg, A_002.jpg, . . . 734 according to an order of displaying the representative video frame images.

The audio 714 included in the input video may be stored as an audio file having an extension such as way, mp3, or wma. A file name of the audio 714 may be determined to be related to the file name of the slide video 718. Referring to FIG. 7, if the file name of the slide video 718 is determined as A.PLT 750, the file name of the audio 714 may be determined as A.wav 744 according to an order of displaying the representative video frames.

The slide video 718 may be stored as a file having a predetermined extension. According to FIG. 7, for example, the extension of the slide video file may be PLT. The slide video file may include data about representative video frames and audio. Therefore, the slide video may be independently reproduced without files about the representative video frame images and files about the audio data related to the slide video.

On the contrary, the slide video file may include information about a location where data of the representative video frames and the audio is stored, instead of including the data about the representative video frames and the audio. For example, A.PLT 750 may include information about locations of the files A_001.jpg, A_002.jpg . . . 734 and A.wav 744.

The representative video frame images 710, the audio 714, and the slide video 718 are not necessarily stored in the same storage device, but may be distributed to be stored.

FIGS. 8A to 8D are diagrams of a program capable of generating and reproducing a slide video according to one or more exemplary embodiments.

Figure 8A:
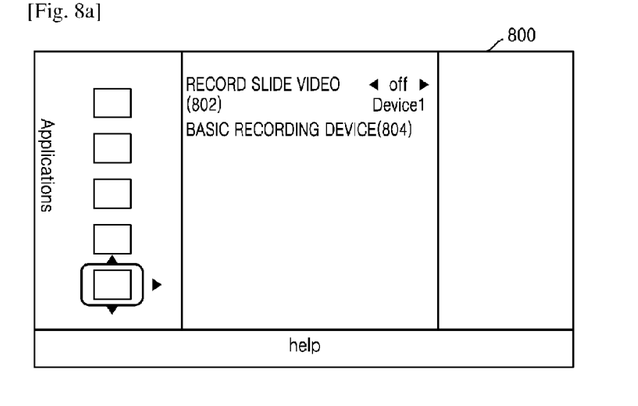
FIGS. 8A to 8D are diagrams illustrating an example of a program having a slide video generation and reproduction function.

FIG. 8A shows a display screen 800 of an application for activating a slide video generation function. The display screen 800 of the application displays a slide video record 802 and a basic recording device 804. When the slide video record 802 is selected, it may be determined whether an application for activating the slide video generation function is to be displayed on the display screen 800. When an option of the slide video record 802 is selected as 'on', the basic recording device 804 may be selected. When the basic recording device 804 is selected, it may be determined which device is to execute the slide video generation function.

Figure 8B:
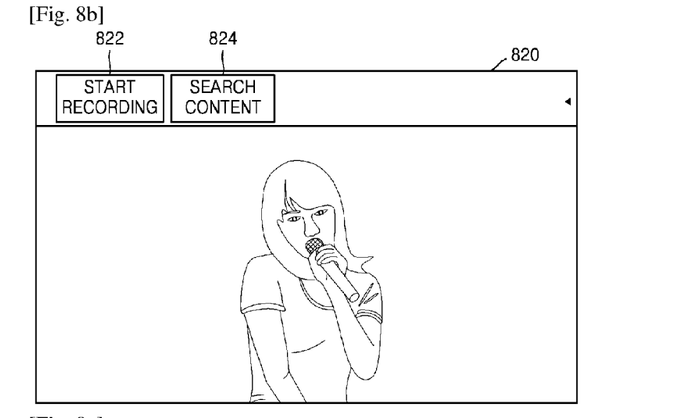

FIG. 8B shows a display 820 for reproducing a video. When a user of a video processing apparatus selects a start record button 822 displayed on an upper end portion of the display 820 to generate a slide video by using the video being reproduced on the display 820 as an input video. Also, the user may select a content search button 824 displayed on the upper end portion of the display 820 to search for a slide video that has been generated.

Figure 8C:
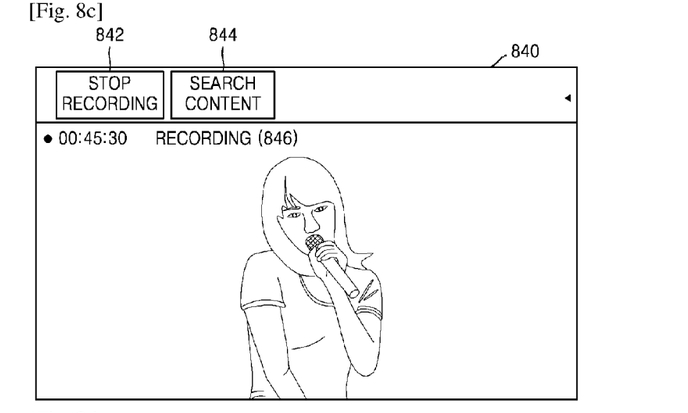

FIG. 8C shows a display 840 showing generation of the slide video. The user of the video processing apparatus selects a record stop button 842 displayed on an upper end portion of the display 840 to stop generating the slide video. Also, the user may select the content search button 844 displayed on the upper end portion of the display 840 to search for the slide video that has been generated already even while generating the slide video. When the slide video is being generated, a recording sign 846 may be displayed on an upper end portion of the input video. Also, a playing time of the generated slide video may be displayed.

Figure 8D:
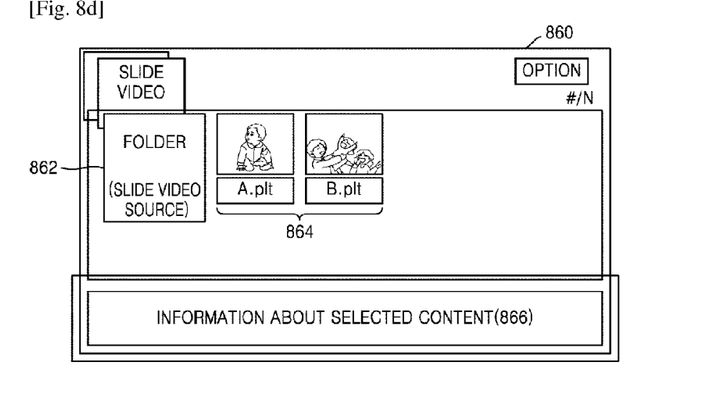

FIG. 8D shows an execution screen 860 of an application having a function of content searching. The execution screen 860 may display a folder 862 including images and audio files about slide video files 864, the slide video files 864, and information 866 about selected content. The information 866 about the selected content may include metadata about a producer, a play time, and an encoding type of the input video. The user may search for a slide video file, and an image or an audio file about the slide video file by using the application.

The exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

The invention claimed is:

1. A video processing method, comprising:
acquiring an input video including a plurality of video frames and audio frames;
dividing the input video into one or more sections;

determining a representative video frame from among the plurality of video frames with respect to each of the one or more sections; and acquiring a slide video that includes each of the representative video frames, wherein each of the representative video frames is displayed as long as a play time of a section corresponding to each of the representative video frames, and each of the representative video frames is synchronized with audio frames corresponding to the section of each of the representative video frames, and wherein when a certain object provided from the input video is included in a video frame, the video frame including the certain object is determined as the representative video frame.

2. The video processing method of claim 1, wherein the dividing of the input video is performed so that the one or more sections have equal lengths.

3. The video processing method of claim 1, wherein the determining of the representative video frame is performed based on information about viewer's preferences when the information about the viewer's preferences with respect to the plurality of video frames included in the input video is provided.

4. A video processing method, comprising:
acquiring an input video including a plurality of video frames and audio frames;
dividing the input video into one or more sections;
determining a representative video frame from among the plurality of video frames with respect to each of the one or more sections; and
acquiring a slide video that includes each of the representative video frames,
wherein each of the representative video frames is displayed as long as a play time of a section corresponding to each of the representative video frames, and each of the representative video frames is synchronized with audio frames corresponding to the section of each of the representative video frames,
wherein the determining of the representative video frame is performed based on analysis of at least one of the audio frames and the plurality of video frames, and
wherein when a certain sound is detected from the audio frames, the representative video frame is determined based on a location where the certain sound is reproduced.

5. A video processing method, comprising:
acquiring an input video including a plurality of video frames and audio frames;
dividing the input video into one or more sections;
determining a representative video frame from among the plurality of video frames with respect to each of the one or more sections;
acquiring a slide video that includes each of the representative video frames;
extracting a representative text corresponding to each of the representative video frame, when text information accompanied with the input video is provided,
wherein each of the representative video frames is displayed as long as a play time of a section corresponding to each of the representative video frames, and each of the representative video frames is synchronized with audio frames corresponding to the section of each of the representative video frames, and wherein the acquiring of the slide video comprises acquiring a slide video that includes the representative text corresponding to each of the representative video frame.

6. A video processing apparatus, comprising:
an input unit configured to receive an input video including a plurality of video frames and audio frames; and
a video processing unit configured to divide the input video into one or more sections, determine a representative video frame from among the plurality of video frames included in each section with respect to each of the one or more sections, and acquire a slide video that includes each of the representative video frames,
wherein each of the representative video frames is displayed as long as a play time of a section corresponding to each of the representative video frames,
wherein each of the representative video frames is synchronized with the audio frames corresponding to the section of each of the representative video frames, and
wherein when a certain object provided from the input video is included in a video frame, the video processing unit is further configured to determine the video frame including the certain object as the representative video frame.

7. The video processing apparatus of claim 6, wherein the video processing unit divides the input video so that the one or more sections have equal lengths.

8. The video processing apparatus of claim 6, wherein when information about viewer's preferences with respect to the plurality of video frames included in the input video is provided with the input video, the video processing unit is further configured to determine the representative video frame based on the information about the viewer's preferences.

9. A video processing apparatus, comprising:
an input unit configured to receive an input video including a plurality of video frames and audio frames; and
a video processing unit configured to divide the input video into one or more sections, determine a representative video frame from among the plurality of video frames included in each section with respect to each of the one or more sections, and acquire a slide video that includes each of the representative video frames,
wherein each of the representative video frames is displayed as long as a play time of a section corresponding to each of the representative video frames,
wherein each of the representative video frames is synchronized with the audio frames corresponding to the section of each of the representative video frames,
wherein the video processing unit is further configured to determine the representative video frame based on analysis of at least one of the audio frames and the plurality of video frames, and
wherein when a certain sound is detected from the audio frames, the video processing unit is further configured to determine the representative video frame based on a location where the certain sound is reproduced.

10. A video processing apparatus, comprising:
an input unit configured to receive an input video including a plurality of video frames and audio frames; and
a video processing unit configured to divide the input video into one or more sections, determine a representative video frame from among the plurality of video frames included in each section with respect to each of the one or more sections, and acquire a slide video that includes each of the representative video frames, wherein each of the representative video frames is displayed as long as a play time of a section corresponding to each of the representative video frames, and each of the representative video frames is synchronized with the audio frames corresponding to the section of each of the representative video frames, wherein the input unit is further configured to acquire text information when the text information accompanied with the input video is provided, and the video processing unit is configured to extract a representative text corresponding to each of the representative video frames from the text information and acquire the slide video in which the representative text corresponding to each of the representative video frames is included.

11. A non-transitory computer-readable recording medium having embodied thereon a computer program for executing the video processing method according to claim 1.

\* \* \* \* \*